United States Patent
Okubo (10) Patent No.: US 10,373,329 B2
(45) Date of Patent: Aug. 6, 2019

(54) INFORMATION PROCESSING APPARATUS, INFORMATION PROCESSING METHOD AND STORAGE MEDIUM FOR DETERMINING AN IMAGE TO BE SUBJECTED TO A CHARACTER RECOGNITION PROCESSING

(71) Applicant: CANON KABUSHIKI KAISHA, Tokyo (JP)

(72) Inventor: Yuzuru Okubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 15/446,404

(22) Filed: Mar. 1, 2017

(65) Prior Publication Data

US 2017/0263013 A1  Sep. 14, 2017

(30) Foreign Application Priority Data

Mar. 9, 2016  (JP) .................................. 2016-045918

(51) Int. Cl.
| | |
|---|---|
| G06T 7/60 | (2017.01) |
| G06K 9/62 | (2006.01) |
| H04N 5/232 | (2006.01) |
| G06K 9/00 | (2006.01) |

(52) U.S. Cl.
CPC ............ G06T 7/60 (2013.01); G06K 9/00449 (2013.01); G06K 9/6232 (2013.01); H04N 5/232 (2013.01); G06K 2209/01 (2013.01)

(58) Field of Classification Search
None
See application file for complete search history.

(56) References Cited

U.S. PATENT DOCUMENTS

| | | | | |
|---|---|---|---|---|
| 9,179,061 | B1* | 11/2015 | Kraft | G06T 15/08 |
| 2006/0002607 | A1* | 1/2006 | Boncyk | G06F 17/30247 |
| | | | | 382/165 |
| 2008/0313172 | A1* | 12/2008 | King | G06F 17/241 |
| 2011/0025860 | A1 | 2/2011 | Katougi et al. | |
| 2013/0129142 | A1* | 5/2013 | Miranda-Steiner | ......... |
| | | | | G06K 9/00664 |
| | | | | 382/103 |
| 2015/0286449 | A1* | 10/2015 | Masui | G06Q 10/06 |
| | | | | 358/1.14 |

FOREIGN PATENT DOCUMENTS

| | | | | |
|---|---|---|---|---|
| JP | 2005-341229 A | | 12/2005 | |
| JP | 2005341229 A | * | 12/2005 | |
| JP | 2010-277442 A | | 12/2010 | |
| JP | 2013008389 A | * | 1/2013 | |
| JP | 5561331 B2 | | 7/2014 | |

* cited by examiner

*Primary Examiner* — Edemio Navas, Jr.
(74) *Attorney, Agent, or Firm* — Venable LLP (57) ABSTRACT

An information processing apparatus acquires an image obtained by photographing a part of the subject, specifies a relative position which part of the subject is photographed to obtain the image, determines a specific area included in the obtained image based on the specified relative position, and calculates an edge amount of the specific area. Then, in a case where the calculated edge amount in the specific area is larger than a first threshold, a character recognition processing is performed on the specific area included in the acquired image.

11 Claims, 8 Drawing Sheets

INFORMATION PROCESSING APPARATUS, INFORMATION PROCESSING METHOD AND STORAGE MEDIUM FOR DETERMINING AN IMAGE TO BE SUBJECTED TO A CHARACTER RECOGNITION PROCESSING

BACKGROUND OF THE INVENTION

Field of the Invention

The present invention relates to a technique for determining an image to be subjected to a character recognition processing.

Description of the Related Art

Conventionally, text information included in an image is acquired and used by performing an optical character recognition (OCR) processing on an image of a paper document. Further, in recent years, mobile terminals having camera functions have become widespread. Conventionally, a user used a scanner or the like to electronically capture a paper document, but it became possible to easily capture the paper document electronically by using a camera of a mobile terminal. For this reason, it is becoming common to perform the OCR processing on the image of the paper document photographed with the camera of the mobile terminal.

In a case where text information recognized by the OCR processing is used, an OCR accuracy becomes important. However, compared with an OCR accuracy for an image such as a business card or a license card that can be taken close to a target object, an OCR accuracy for an image obtained by photographing a relatively large paper document such as A4 or A3 with a camera is lowered. This is because a resolution per a character of the text to be recognized decreases as the distance between the camera and the target object increases. Therefore, in the case of the paper document of relatively large size such as A4 or A3, the OCR accuracy can be improved by capturing an image obtained by taking a close-up photograph of the text area to be recognized. However, blurring of the photographed image is likely to occur by merely taking the close-up photograph, and it is difficult to photograph an image with little hand-trembling, which is suitable for the OCR.

Japanese Patent Laid-Open No. 2010-277442 discloses a technique for taking a photograph using a camera of a mobile terminal and determining whether or not the picture is acceptable. Japanese Patent Laid-Open No. 2010-277442 is a technique for determining that an image of which edge information or the like of image data obtained by using a camera of a mobile terminal matches a predetermined condition is passed.

SUMMARY OF THE INVENTION

An information processing apparatus according to the present invention includes an acquisition unit configured to acquire an image obtained by photographing a part of a subject; a specification unit configured to specify a relative position between the obtained image and the entire subject; a determination unit configured to determine a specific area included in the obtained image based on the specified relative position; a calculation unit configured to calculate an edge amount of the determined specific area; and a character recognition unit configured to execute a character recognition processing on the specific area in a case where the calculated edge amount in the specific area is larger than a first threshold.

Further features of the present invention will become apparent from the following description of exemplary embodiments (with reference to the attached drawings).

DESCRIPTION OF THE EMBODIMENTS

It is more efficient to perform an OCR processing on a range limited to a candidate area to be processed in an image rather than on an entire image. Japanese Patent Laid-Open No. 2010-277442 is a technique for determining that an image in which edge information of an entire image matches a predetermined condition is passed, so that it is not possible to correctly determine whether or not blurring occurs in a desired area (for example, a character area) of a photographed image in the technique of Japanese Patent Laid-Open No. 2010-277442.

Hereinafter, embodiments for carrying out the present invention will be described with reference to the drawings and the like. The embodiments do not limit the present invention, and all the configurations described in the embodiments are not necessarily indispensable for solving the problem of the invention.

First Embodiment (External Appearance)

As an example of the information processing apparatus according to the present embodiment, a mobile terminal will be described. The mobile terminal is an example of a portable communication terminal, and is a terminal that implements a wireless communication function and the like and can be used in a free location.

Figure 1A:
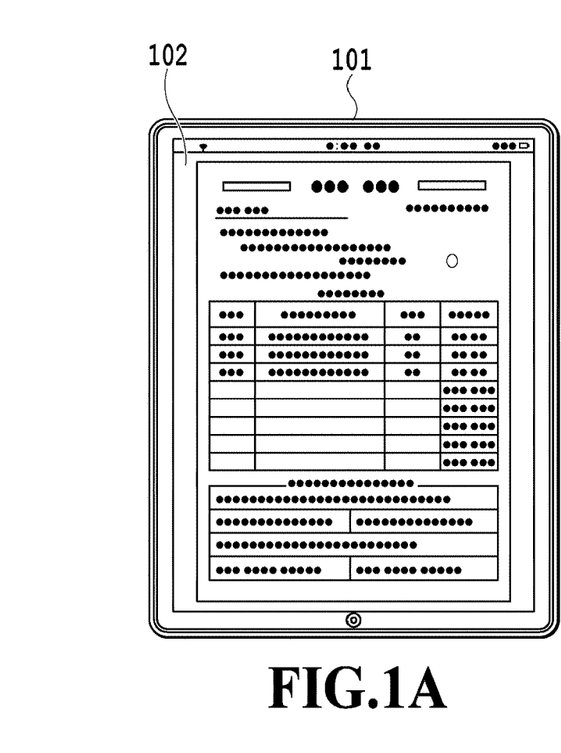
FIGS. 1A to 1C are diagrams showing an example of an external appearance of a mobile terminal.
Figure 1B:
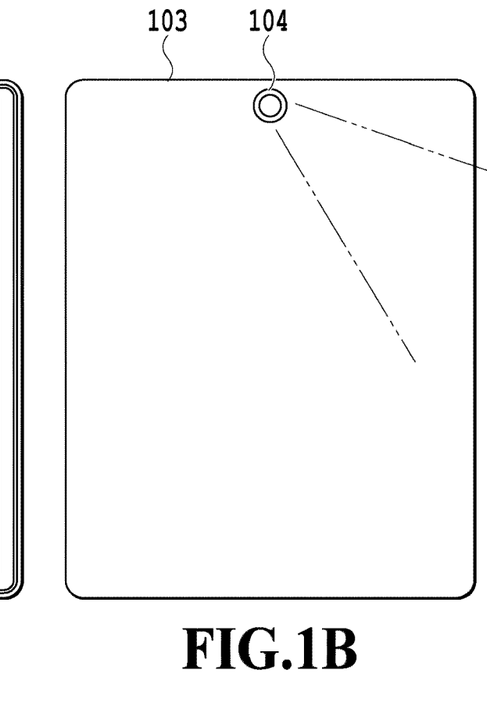
Figure 1C:
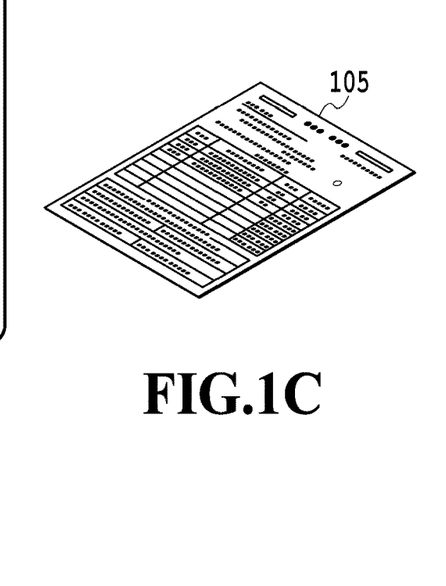

FIGS. 1A to 1C are diagrams showing an example of an external appearance of a mobile terminal. FIG. 1A shows a mobile terminal front surface portion 101 on a front side of a mobile terminal 100. The mobile terminal front surface portion 101 includes a touch panel 102. The touch panel 102 is an example of a display part such as a display, and has two functions of an output (display) and an input. FIG. 1B shows a mobile terminal rear part 103 on a back side of the mobile terminal 100 in FIG. 1A. The mobile terminal rear part 103 includes a camera 104 for capturing an image. FIG. 1C shows a subject 105 to be imaged by the camera 104 of the mobile terminal 100. In the present embodiment, a user of the mobile terminal 100 may start the process by photographing the subject 105 through a mobile application described later. The subject 105 described in this embodiment is, for example, an order form of a paper document. The subject 105 is not limited to the paper document, but may be another type of the subject such as a business card, a photograph, a white board or the like. A mobile application described later can capture an image of the subject 105 and output the image to the touch panel 102.

(Hardware Configuration)

Figure 2:
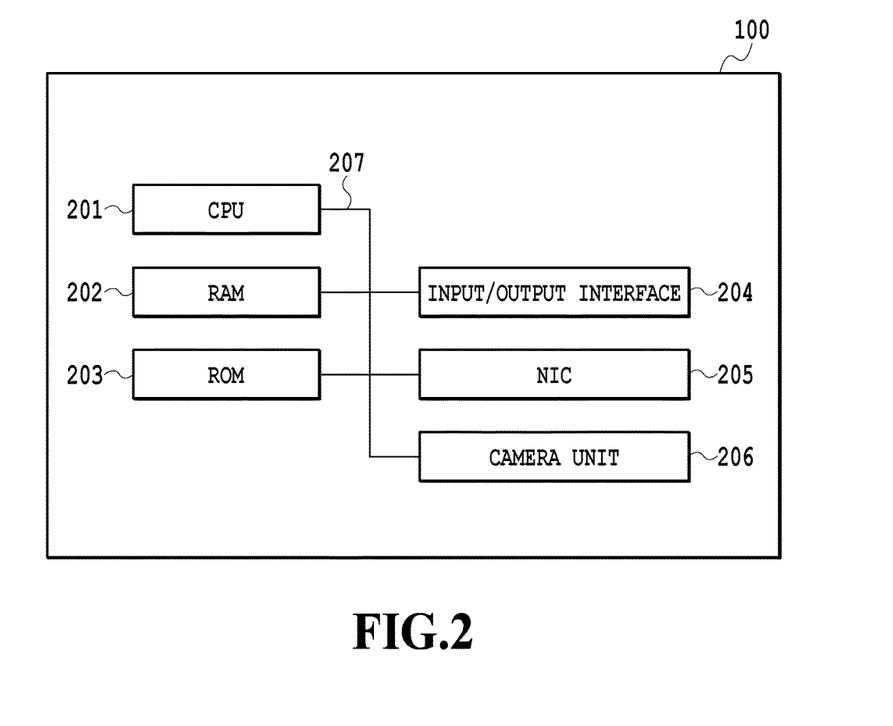
FIG. 2 shows an example of a hardware configuration of the mobile terminal.
Figure 3:
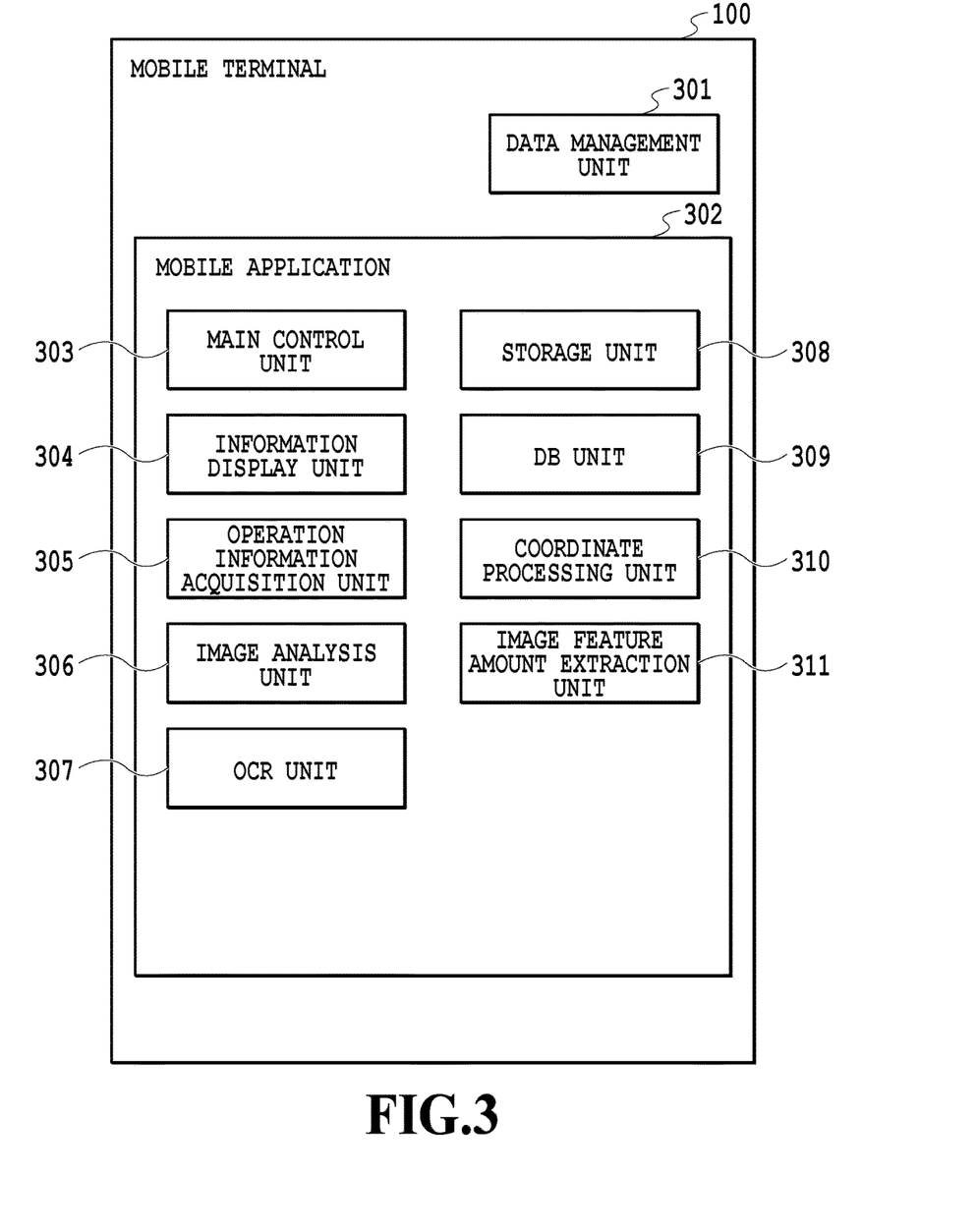
FIG. 3 is a diagram showing an example of a software configuration of the mobile terminal.

FIG. 2 shows an example of a hardware configuration of the mobile terminal 100. The mobile terminal 100 includes a CPU (Central Processing Unit) 201, a RAM (Random Access Memory) 202, a ROM (Read Only Memory) 203, an Input/Output interface 204, a NIC 205, and a camera unit 206. The CPU 201 is a unit that executes various programs and realizes various functions. The RAM 202 is a unit that stores various types of information. Further, the RAM 202 is also used as a temporary working storage area of the CPU 201. The ROM 203 is a unit that stores various programs and the like. For example, the CPU 201 loads the program stored in the ROM 203 into the RAM 202 and executes the program. Further, the CPU 201 executes processing based on a program stored in an external storage device such as a flash memory, an HDD (Hard Disk Drive) or an SSD (Solid State Disk). Thus, the software configuration constituting the mobile terminal 100 as illustrated in FIG. 3 and a process of each step of a sequence to be described later are realized. All or a portion of the processes related to the function of the mobile terminal 100 and the sequence to be described later may be realized by using a dedicated hardware.

The Input/Output interface 204 transmits display data to the touch panel 102 and receives input information transmitted from the touch panel 102. The NIC (Network Interface Card) 205 is a unit for connecting the mobile terminal 100 to a network (not shown). The camera unit 206 is connected to the camera 104 and captures the image of the subject 105 into the mobile terminal 100. The bus 207 is a data communication path for performing transmission and reception among the units described above.

(Software Configuration (Mobile Terminal))

Next, the configuration of the software in the mobile terminal 100 will be described. FIG. 3 is a diagram showing an example of the software configuration of the mobile terminal 100. A program for realizing a function (a module part) of each software (application) illustrated in FIG. 3 is stored in the ROM 203 or the like of the mobile terminal 100.

An OS (Operating System) (not shown) of the mobile terminal 100 includes a data management unit 301. The data management unit 301 manages an image data and an application data. The OS provides a control API (Application Programming Interface) for using the data management unit 301. Each application acquires and stores image data and application data managed by the data management unit 301 by using the control API.

A user of the mobile terminal 100 may download and install a mobile application (hereinafter, referred to as a mobile application) 302 by using the installation function of the OS of the mobile terminal 100. In addition, the mobile application 302 can be executed by the CPU 201. The mobile application 302 performs various data processing on the image of the subject 105 captured via the camera unit 206. The mobile application 302 includes a plurality of module parts. More specifically, the mobile application 302 includes a main control unit 303, an information display unit 304, an operation information acquisition unit 305, an image analysis unit 306, an OCR unit 307, a storage unit 308, a DB unit 309, a coordinate processing unit 310, and an image feature amount extraction unit 311.

The main control unit 303 controls the mobile application 302 for the mobile terminal 100, and instructs and manages each of the module parts 303 to 311 to be described later.

Figure 4:
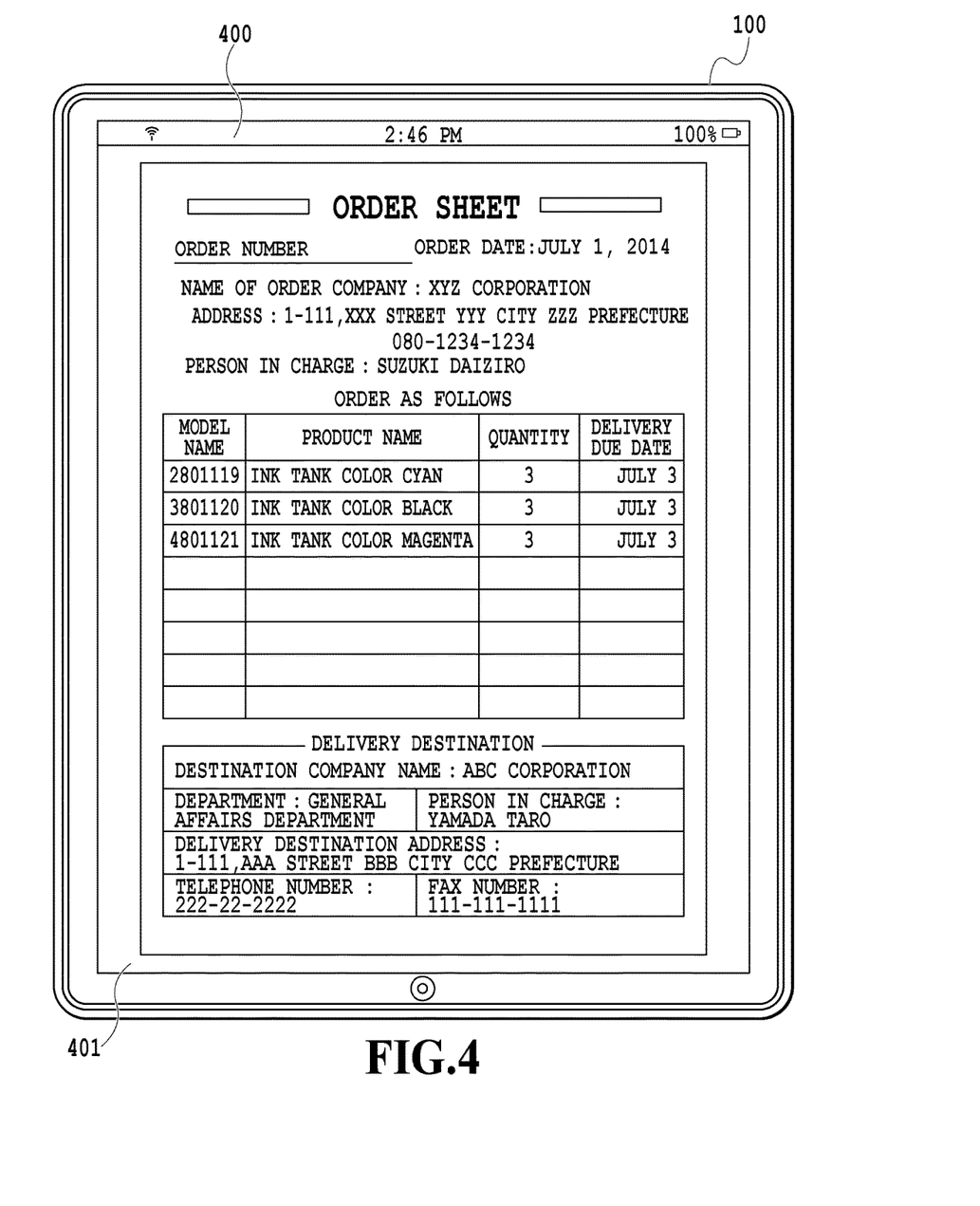
FIG. 4 is a diagram showing an example of a UI of a mobile application.

The information display unit 304 provides the user with the user interface (UI) of the mobile application 302 in accordance with an instruction from the main control unit 303. FIG. 4 is a diagram showing an example of a screen (a mobile terminal screen 400) for providing the UI (UI for the mobile terminal) of the mobile application 302. The mobile terminal screen 400 is displayed on the touch panel 102 of the mobile terminal 100. Further, in a display and operation area 401 on the mobile terminal screen 400, images captured via the camera 104 are displayed. The operation information acquisition unit 305 receives an operation by a user on an image or the like via the displayed UI. Further, a form of the UI (position, size, range, arrangement, display content, etc.) of the mobile application 302 is not limited to the form illustrate in the figure, but may be suitably configured to realize the function of the mobile terminal 100.

Returning to FIG. 3 again, each module of the mobile application 302 is described. The operation information acquisition unit 305 acquires user operation information on the UI of the mobile application 302 displayed by the information display unit 304, and notifies the main control unit 303 of thus acquired information. For example, in a case where the user touches the display and operation area 401 with user's hand, the operation information acquisition unit 305 senses information on the position on the touched screen and transmits information on the detected position to the main control unit 303.

The image analysis unit 306 analyzes the image acquired via the camera unit 206, in other words, the image captured using the camera 104, and generates layout information. Layout information includes a rectangular area extracted from the image and its type (character, figure, line, table, etc.). Further, the image analysis unit 306 performs a paper surface detection processing and a distortion correction processing on a camera input image. In addition, the camera unit 206 can not only perform a still-photographing, but also has a moving-picture photographing function capable of acquiring a still picture at high speed or a continuous photographing function.

The OCR unit 307 performs an OCR (optical character recognition) processing on a rectangular area extracted by the image analysis unit 306. The storage unit 308 stores a value acquired by the operation information acquisition unit 305, that is, a value input by the user via the UI of the mobile application 302. Further, the storage unit 308 stores data and the like managed by the DB unit 309 to be described later.

The DB unit 309 has a database function and manages coordinate information, a feature amount of an image, an edge image and the like of a rectangular area selected by the user. Here, coordinate information of the rectangular area includes coordinate information of a specific area in a local image to be described later and coordinate information of a text area selected in a case where the user approves the result of the OCR processing. The local image is an image of a range of a part of the entire subject. The edge image is an image corresponding to the local image, each pixel of the edge image having a value indicating an edge intensity. Details of these will be described later. The data managed in the DB unit 309 is stored in the storage unit 308.

The coordinate processing unit 310 performs a position specifying process of the image and a coordinate conversion process in a case where registering coordinate information in the database. The coordinate processing unit 310 performs the position specifying process of the image, using a feature amount (hereinafter, referred to as an image feature amount) of the image extracted by the image feature amount extraction unit 311 to be described later. Further, the coordinate processing unit 310 specifies position information (coordinate information) of a specific area in the local image, using the image feature amount.

The image feature amount extraction unit 311 performs an extraction process of the image feature amount on the image captured by the camera. The image feature amount is information for specifying a characteristic location in the image and is used for specifying a corresponding position to a local image in the entire image, for example. As a method of extracting the feature amount, there is a calculation method such as SIFT, SURF, HOG and the like. The extracted image feature amount is used by the coordinate processing unit 310 to calculate position information of the specific area (a rectangular portion) in the local image.

(Entire Image and Local Image)

Figure 5A:
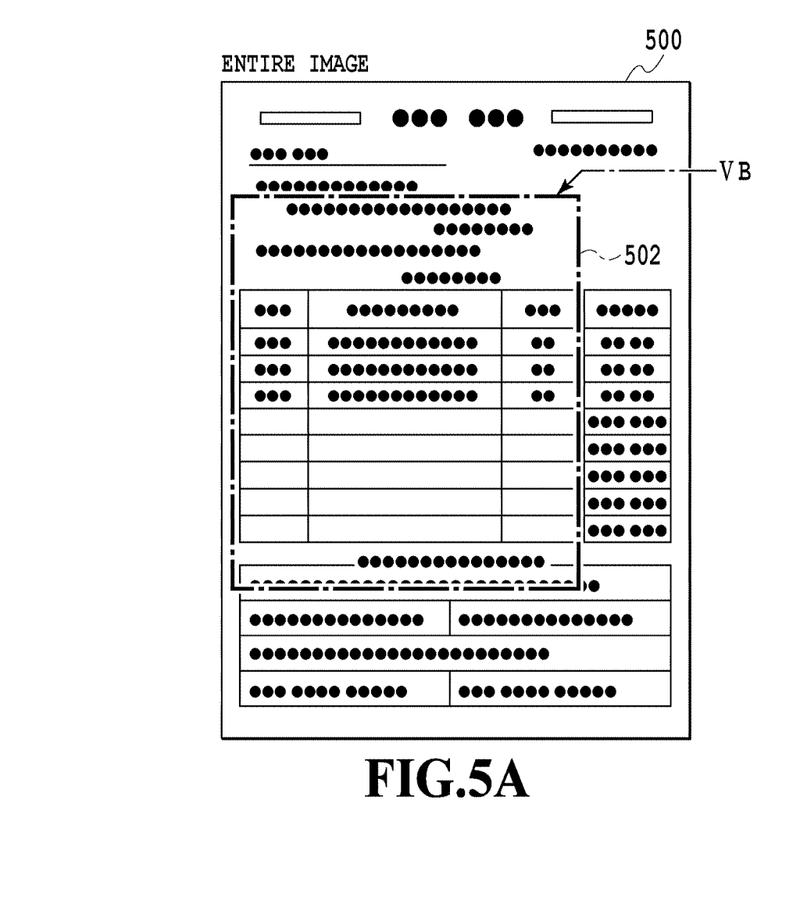
FIG. 5A shows an example of an entire image.
Figure 5B:
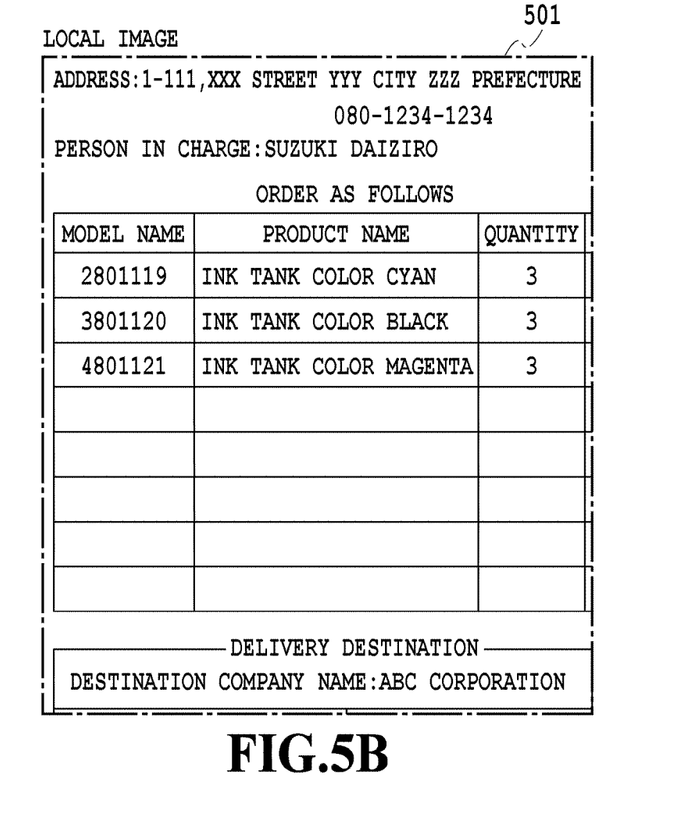
FIG. 5B shows an example of a local image.

Next, the entire image and the local image will be described with reference to FIGS. 5A and 5B. The local image is an image of a range of a part of an entire subject. The camera unit 206 acquires an image of an entire document of the subject 105 via the camera 104. For an input image thus acquired, the image analysis unit 306 performs a paper surface detection processing for excluding areas other than the subject and a distortion correction processing for correcting distortion portions to shape the input image. This shaped image is called an entire image. FIG. 5A shows an example of an entire image 500. In this way, the entire image is an image of the entire subject 105.

Here, a part of an image of the subject 105 obtained by bringing the camera 104 close to the subject 105 and photographing (or enlarged photographing by optical zooming) the subject 105 is called a local image. In other words, the local image is equal to a part of the subject acquired as a high-resolution image. A local image 501 is an example of the local image. Further, a relative position 502 indicates a relative position of the portion taken as the local image in the entire image. As described above, the image feature amount extraction unit 311 acquires an image feature amount (information for specifying a characteristic portion) at the time of capturing the entire image. In addition, the image feature amount extraction unit 311 acquires the image feature amount at the time of capturing the local image. The coordinate processing unit 310 can specify the captured relative position of the local image in the entire image by collating the image feature amount at the time of capturing the local image and the image feature amount at the time of capturing the entire image. In the present embodiment, specifying these pieces of position information is not focused on, so a detailed description thereof will be omitted.

(Basic Flow)

Next, a basic processing flow in the mobile terminal 100 will be described with reference to FIG. 6. In other words, a process of obtaining a result of a character recognition process from the image obtained by photographing the subject using the mobile application 302 will be described. As described above, the flowchart shown in FIG. 6 is a process executed by the mobile application 302 of the mobile terminal 100. In other words, this processing is realized by performing an operation in which the CPU 201 develops a program of the mobile application 302 stored in the ROM 203 in the RAM 202 and executes the program.

Starting of this flow is triggered in a case where the mobile application 302 of the mobile terminal 100 acquires an image obtained by bringing the camera 104 close to the subject 105 as a trigger. In other words, as described above, the entire image has already been photographed, and the image feature amount of the entire image has already been extracted too. In this state, the flowchart of FIG. 6 starts from a processing in which the user brings the camera 104 to the subject 105 and acquires a local image.

In step S601, the main control unit 303 of the mobile application 302 performs an image selection processing to select an image suitable for the OCR. Specifically, a local image determined to be an image suitable for the OCR is displayed in the display and operation area 401, and a text area included in the local image is displayed. In other words, the OCR processing is performed on the local image determined to be suitable for the OCR, and a text obtained as a result of the OCR is superimposed on a corresponding portion (a text area) of the local image and displayed. Detailed processing in step S601 will be described later with reference to FIG. 7. In the present embodiment, the user checks the text area on the local image to be displayed as a result of this step S601, and determines whether or not the processing result of the OCR is correct. Then, the user selects (touch-inputs) the text area for which the processing result of the OCR is determined to be correct through a UI screen. In a case where the user selects the text area through the UI screen, the mobile application 302 determines that the processing result of the OCR of the text area is correct.

In step S602, the mobile application 302 determines whether or not the user selects the text area on the local screen. If the user selects the text area, the process proceeds to step S603. If there is no selection by the user, the process returns to step S601 and the image selection processing is performed again. In other words, as described above, if there is no area for which the user determines that the processing result of the OCR is correct, no selection is made by the user. Thus, the image selection processing to select the image suitable for the OCR is performed again, and the text area is displayed. This step is not necessary for use cases where the selection by the user cannot be made and the like. However, according to this step, a final decision may be made not only by a machine but also by human visual observation. In addition, here, the process in step S602 is described by providing by way of example the case of the selection process in which the user informs the mobile application 302 of the result of determining whether or not the text area is correct, but is not limited thereto. For example, a process may be included in which user makes a modification to the text with respect to the text area selected by the user.

In step S603, the mobile application 302 requests the data management unit 301 to store the result of the OCR of the text area selected in step S602 and a photographed image (a local image) of the target object to be subjected to the OCR processing in the mobile terminal 100. The result of the OCR includes text data of the result of the OCR and corresponding position information in the entire image. Thus, the text data of the corresponding position in the entire image is determined. As described above, in the processing according to the present embodiment, the OCR is performed on each of a plurality of the local images so as to obtain the text data in the entire image by the OCR, such that a highly accurate result of the OCR processing may be obtained. In addition, as described later, the OCR processing is performed with respect to a local image having a little blurring so as to obtain a highly accurate result of the OCR processing while preventing performance deterioration.

If there are a plurality of text areas to be displayed as the result of step S601, the processes of the steps S602 and S603 may be repeated. Alternatively, in the process of receiving the selection by the user in step S602, a selection of a plurality of text areas may be allowed. With this series of processes, a result of the OCR processing performed on a local image in an area A, for example, of the entire image is obtained. Here, in a case where there is a separate area B to be subjected to the OCR processing in the entire image, the user moves the camera 104 or the subject 105 so as to capture a local image including the area B again such that the processes of FIG. 6 will be performed.

In this embodiment, the photographed result is stored in the mobile terminal 100, but the photographed result may be immediately uploaded to a PC or a server on the Internet or the like in step S603. Further, a result of the selection may be saved in the data management unit 301, and uploaded at a time to another PC or server later.

(Image Selection Processing Flow)

Figure 6:
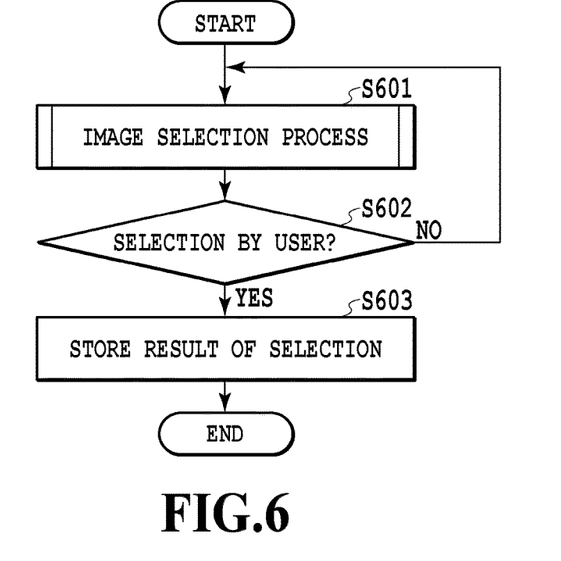
FIG. 6 illustrates a process of obtaining a result of a character recognition process from an image obtained by photographing a subject using the mobile application.
Figure 7:
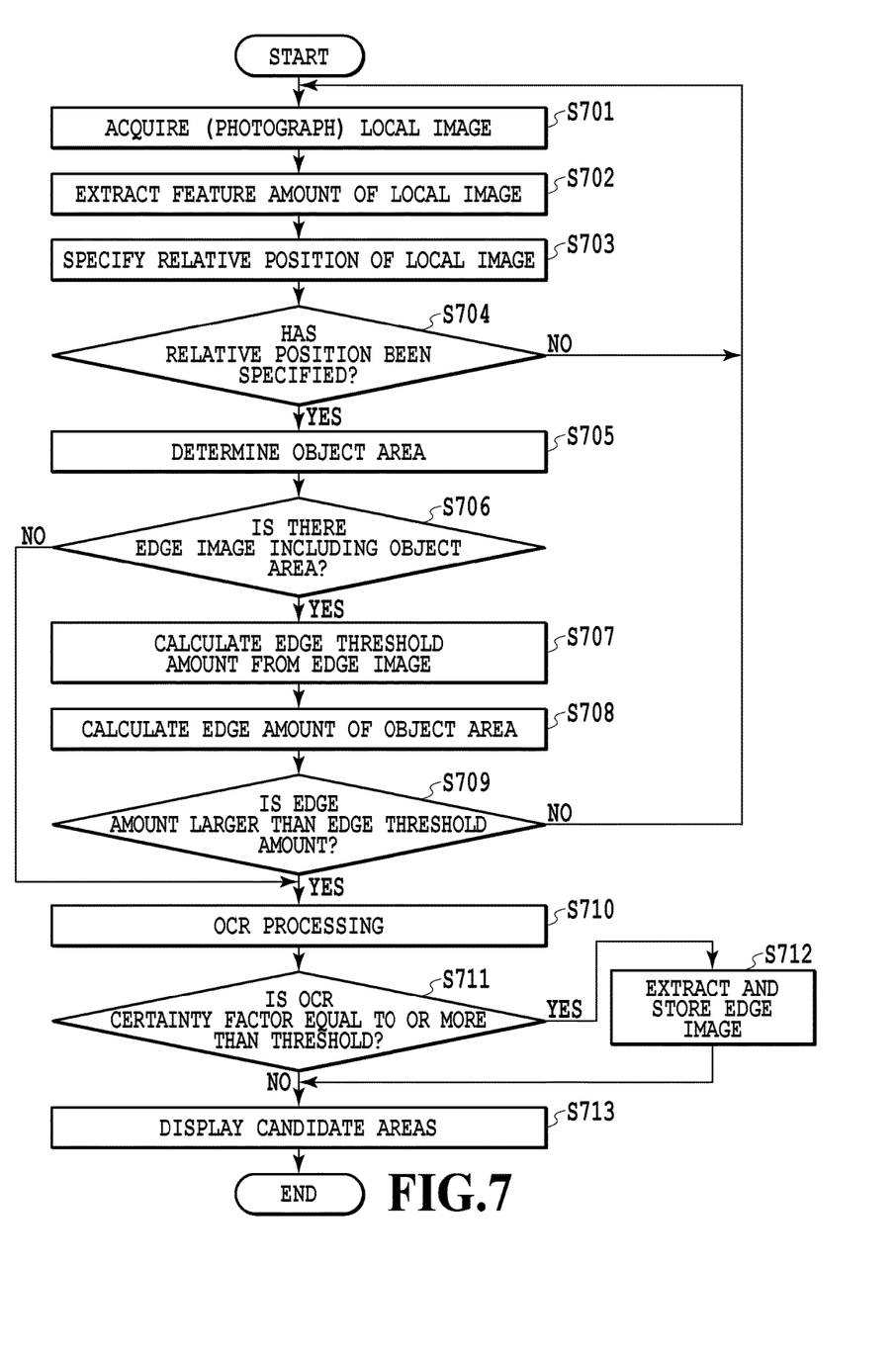
FIG. 7 shows details of an image selection process in step S601 of FIG. 6.

FIG. 7 shows the details of the image selection process in step S601 of the flow of FIG. 6. First, the terms "an edge intensity", "an edge amount" and "an edge image" used in this flow will be described.

The edge intensity is the edge strength calculated for each pixel of the photographed image (a local image in this case) by the image analysis unit 306. In this embodiment, as a method of extracting the edge intensity, a method is adopted in which first derivatives of adjacent pixels in x direction and y direction is obtained and a sum of absolute values thereof is taken as the edge strength of the pixels. Using such a method, a stronger edge intensity can be obtained, as a difference in luminance between adjacent pixels is larger. However, another edge extraction method may be used, as long as edge amounts to be described later can be compared with each other. For example, the edge intensity of each pixel in the photographed image may be obtained using a Sobel filter.

The edge amount is an amount (a value) calculated based on the edge intensity within a specific range (a specific object area) of the photographed image (the local image). Specifically, the specific object area is a candidate rectangular area to be subjected to the OCR processing. The edge amount may be a sum of the edge intensities of pixels in the object area or may be an average value of the edge intensities of pixels in the object area. The edge amount may be calculated by any other method, as long as comparable values can be calculated. In other words, the edge amount may also be referred to as a value indicating an extent of the edge of the area to be subjected to OCR processing.

The edge image is data obtained by extracting the edge intensity of each pixel from the photographed image (the local image) and expressing the value of each pixel with the edge intensity. The number of pixels and a resolution of the edge image may not necessarily coincide with the original photographed image. In the present embodiment, the edge image is generated and stored using the photographed image (the local image) which is photographed in a case where it is determined to be good to the OCR processing (see step S712 to be described later). The reason for saving the edge image will be explained. In the present embodiment, a predetermined edge amount is used as a criterion for determining whether to perform the OCR processing on a captured image. To explain in more detail with a specific example, it is assumed that a specific object area X is included in the photographed image. Other object areas may also be included in the photographed image, but only the object area X is considered here in order to simplify the explanation. It is assumed that this object area X is a text area to be subjected to the OCR processing. In the present embodiment, every time a photographed image is acquired, a process is performed to determine whether the photographed image including the object area X is an image suitable for the OCR processing. A predetermined edge amount corresponding to the object area X is used as a determination reference in this determination processing. In an image which has much blurring, the edge amount becomes smaller than the original edge amount due to an influence of the blurring. In other words, it is possible to determine that the photographed image whose edge amount is equal to or less than a predetermined threshold amount is the image which has blurring. As the predetermined edge amount at this time, an edge image already generated and stored using another photographed image including the object area X is used. This is because it is not necessary to calculate the edge intensity repeatedly in a case where obtaining the predetermined edge amount if the edge image is stored. This is the reason for storing the edge image. Then, the edge image corresponding to the photographed images (the local images) which are good for the OCR processing are sequentially accumulated by repeatedly performing the processing of FIG. 7. Then, it is possible to apply the OCR processing only to the photographed image with a little blurring by calculating the edge threshold amount of the corresponding object area from the accumulated edge image and comparing it with the edge amount of the photographed image (local image).

Next, it will be described in detail based on the flow in FIG. 7. In step S701 of FIG. 7, the mobile application 302 acquires a local image photographed by the camera unit 206. In step S701, a continuous photographing is performed at high speed using a moving-picture photographing function of the camera unit 206. Therefore, it is not necessary for the user to issue a photographing instruction. In other words, the local image is photographed by the camera unit 206 by an operation such as bringing the camera 104 close to an area where the user wishes to perform the OCR, enlarging the area where the user wishes to perform the OCR with a zoom function of the camera, or bringing the subject 105 closer to the camera 104. The mobile application 302 acquires the photographed image through the data management unit 301.

In step S702, the image feature amount extraction unit 311 extracts the image feature amount of the local image 501 acquired in step S701. In step S703, the coordinate processing unit 310 specifies the relative position 502 of the local image in the entire image by using the image feature amount of the pertinent local image. In step S703, as described above, it is possible to perform a process of specifying the relative position 502 of the local image in the entire image using the image feature amount of the local image and the image feature amount of the entire image. In other words, the coordinate processing unit 310 specifies to which part of the entire subject the captured local image 501 corresponds. In a case where specifying the relative position of the local image, the image feature amount of the entire image may not be used. For example, if an edge image of the relative position of the local image in the entire image can be specified by using the image feature amount of the local image acquired in step S701 and the stored edge image, the image feature amount of the entire image is not necessary. Specifically, other methods may be used as long as the relative position of the local image in the entire image can be specified by a method such as printing marks whose position information are known in advance on a form.

In step S704, the mobile application 302 determines whether or not the relative position of the local image acquired in step S701 in the entire image has been specified. In a case where the relative position has been specified, the mobile application 302 transitions to step S705. Otherwise, it transitions to step S701, where another local image is acquired. As will be described later, the edge image is stored with its relative position in the entire image being associated. In a case where the relative position of the photographed image (the local image) can be specified in step S704, it can be determined whether or not a corresponding edge image is present in a process to be described later. On the other hand, in a case where the relative position of the photographed image (the local image) cannot be specified, factors such as the camera 104 being too close to the subject may be considered. Thus, the process returns to step S701 again and another photographed image (the local image) is acquired.

In a case where the relative position of the local image can be specified, in step S705, the OCR unit 307 determines an object area (a specific area) in the local image 501 acquired in step S701. Here, the object area is an area to be subjected to the OCR processing. The object area is, for example, the area that the user selected through the previous processes (that is, the area for which the user has approved that the result of the OCR is correct) in step S602. Further, the object area may be rectangle information obtained in a case where a layout analysis is performed by the image analysis unit 306. In addition, in a case where appropriate area information cannot be obtained, the entire local image 501 may be used as the object area. However, in that case, edge intensities of unnecessary areas may be used for comparison. In step S705, the coordinate processing unit 310 calculates the coordinates of the determined object area using the relative position of the local image specified in step S703 and the local image feature amount extracted in step S702.

In step S706, the main control unit 303 searches whether the edge image including the object area determined in step S705 is stored in the DB unit 309, based on the coordinates of the object area calculated in step S705. In a case where the corresponding edge image is stored, the process proceeds to step S707. In a case where the corresponding edge image is not stored, the process proceeds to step S710. As the case where the corresponding edge image is not stored, for example, the case of firstly performing the processes in the flowchart in FIG. 7, the case where a local image in an area completely different from the area where the previous processes were performed is acquired in step S701 or the like is assumed. In this case, there is no object to be compared with the edge amount of the object area included in the local area in step S701. Therefore, in such a case, the process proceeds to step S710, where the OCR processing is performed. However, in a case where the corresponding edge image is not stored, a plurality of local images may be acquired by performing a continuous photographing within a predetermined period of time, in addition to the transition to step S710. Then, the local image having the largest edge amount among the plurality of local images thus obtained may be subjected to the OCR processing, and the process may proceed to S710, where the OCR processing may be performed.

In a case where the corresponding edge image is stored, in step S707, the main control unit 303 specifies an area corresponding to the object area determined in step S705 from the edge image stored in the DB part. Then, the main control unit 303 obtains the edge amount acquired by aggregating the edge intensities within a specific area and sets thus obtained edge amount as an edge threshold amount (a threshold). Further, in a case where there are a plurality of corresponding stored edge images, the edge amounts of all the corresponding stored edge images may be calculated and the average thereof may be used or the smallest edge amount may be used as the edge threshold amount. The stored edge image is an image corresponding to a local image whose an OCR certainty factor is equal to or larger than a threshold, as described later. Therefore, the edge image has an edge intensity corresponding to a local image suitable for the OCR processing of a specific area. That is, in case of the edge image, the minimum edge amount is secured. Therefore, in a case where there are a plurality of edge images, the smallest edge amount may be used as the edge threshold amount. Besides, one of the edge images may be used randomly in order to improve performance.

In step S708, the image analysis unit 306 calculates the edge amount of the object area of the local image acquired in step S701, which is determined in step S705. In step S709, the main control unit 303 compares the edge threshold amount calculated in step S707 with the edge amount calculated in step S708. In a case where the edge amount of the object area in the local image acquired in step S701 is larger than the edge threshold amount obtained from the edge image, the process proceeds to step S710. In other words, the local image acquired in step S701 may be determined to have a little blurring because the edge amount of the object area in the image is larger than the edge threshold amount obtained from the edge image. Therefore, the OCR processing is performed on the local image with a little blurring. On the other hand, in a case where the edge amount of the object area in the local image acquired in step S701 is equal to or less than the edge threshold amount, the process proceeds to step S701. This is because, in a case where the edge amount is equal to or smaller than the edge threshold amount, it may be determined that the local image acquired in step S701 is an image having blurring. Even though the OCR processing is performed on the image having the blurring, good results cannot be obtained. Thus, the OCR processing is not performed. As a result, a good performance may be guaranteed. In the comparison performed in step S709, continuous photographing may be performed within a certain period of time, in addition to the transition to step S710 in a case where the edge amount exceeds the edge threshold amount. Then, among the plurality of the local images, the local image having a maximum of the edge amount exceeding the edge threshold amount may be used for the comparison in S709 and the OCR processing in step S710 may be performed on the local image. Further, in a case where it is determined that the edge amount is insufficient, adjustment (change) of a photographing condition of the camera unit 206 may be automatically performed. For example, it is sometimes possible to acquire an image with a large edge amount suitable for the OCR by shortening a shutter speed and raising an ISO sensitivity.

In step S710, the OCR unit 307 executes the OCR processing on the object area included in the local image acquired in step S701, which is determined in step S705, and recognizes text information. A processing performance of the OCR may be improved by performing the OCR processing on the object area instead of the entire local image.

In step S711, the OCR unit 307 checks whether the certainty factor of the result of the OCR is greater than or equal to the threshold. Here, the certainty factor represents confidence (probability) of the result of the recognition of the OCR unit 307. It may be said that, the higher the certainty factor, the higher an accuracy of character recognition. The threshold used in step S711 is a value appropriate for an OCR engine to be used. Further, in step S711, the OCR processing is used not only for one direction, for example, only for a horizontal direction, but the OCR processing may also be performed from a plurality of directions to use the highest certainty factor among them. The process proceeds to step S712 in a case where the OCR certainty factor is equal to or greater than the threshold, and the process proceeds to step S713 in a case where the OCR certainty factor is less than the threshold.

In step S712, the image analysis unit 306 generates the edge image from the photographed image (the local image) used for the OCR process. The main control unit 303 stores the generated edge image in the DB unit 309. That is, the image analysis unit 306 generates the edge image from the local image acquired in step S701. Position information (coordinate information) of the object area is specified in the process of step S705. Therefore, the main control unit 303 stores a type of the object area (for example, a text, a table, etc.) included in the edge image and the coordinate information of the object area, together with the edge image. In a case where the OCR certainty factor is equal to or larger than the threshold, the local image is suitable for OCR. That is, the main control unit 303 can determine that the local image is an image with a little blurring. In the next and subsequent processes, the determination in step S709 is performed using the edge image corresponding to the local image. In this way, by using the image with a little blurring as the image to be subjected to the OCR processing, it is possible to improve the performance while increasing the accuracy of the OCR processing. In a case where an edge image including the same object area already exists in the DB unit 309, the edge image with a smaller edge amount may be left, or a maximum number of stored edge images including the same object area may be determined.

Figure 8:
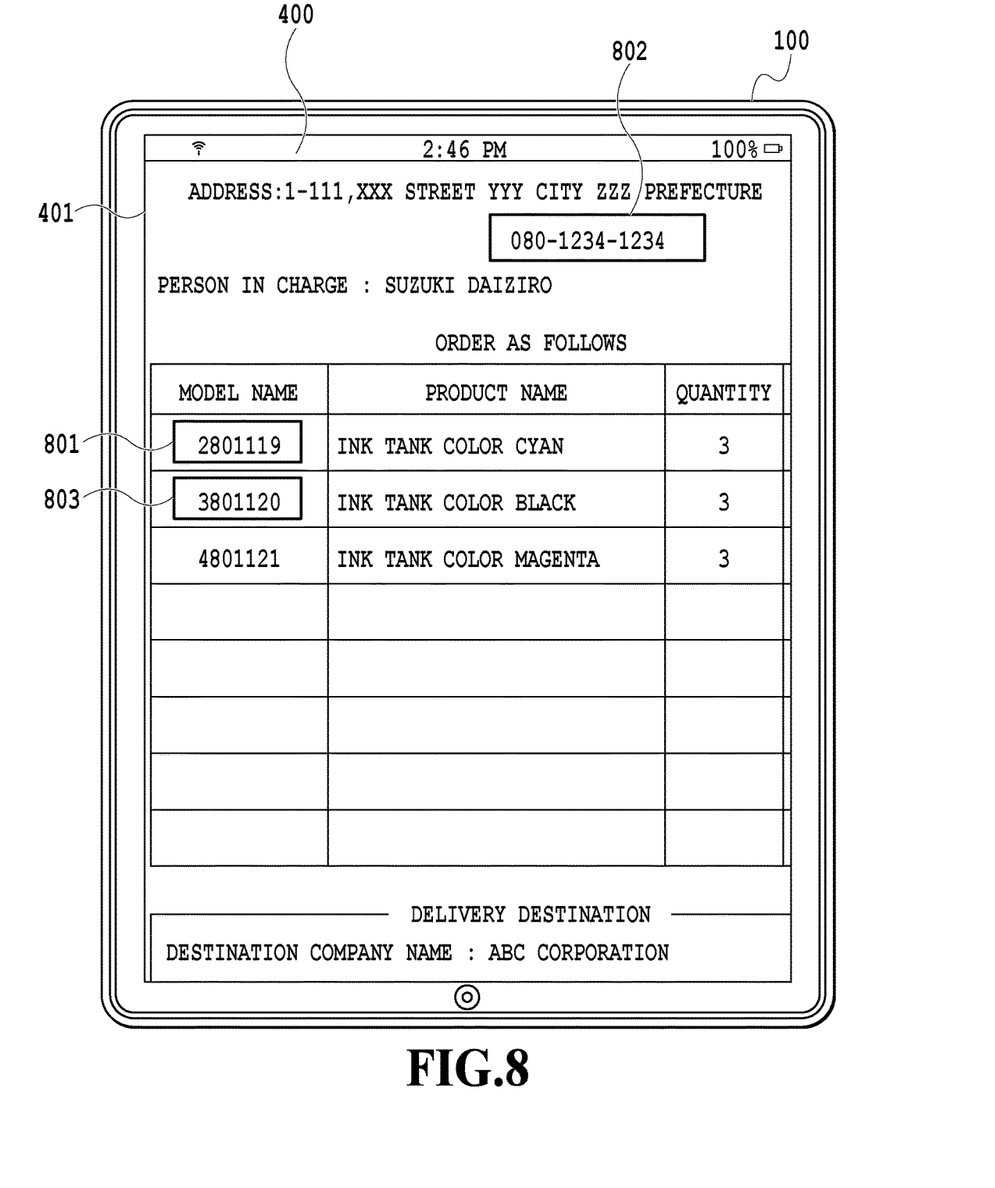
FIG. 8 is a diagram showing an example of displaying a candidate area in the UI of the mobile application.

In step S713, the main control unit 303 displays the text area recognized in step S705 on the touch panel 102 through the information display unit 304. FIG. 8 is a diagram showing an example of the result of the process of step S713. In FIG. 8, it is assumed that the text areas 801, 802, and 803 are text areas recognized in step S705. The text areas 801, 802, and 803 are areas including the text obtained as the result of the OCR processing. That is, in the local image, the text areas 801, 802, and 803 are areas (the areas replaced with text data) in which the text data of the result of the OCR processing is reflected. As shown in FIG. 8, the main control unit 303 can perform an emphasis display such as surrounding with a thick frame so that the user may check the recognized text area. Alternatively, a marker may be attached or blinking may be performed. After displaying a user-selectable text area (a candidate area) in step 713, the main control unit 303 ends the processing in FIG. 7, and proceeds to the processing in step S602 in FIG. 6. In other words, the user selects the area in which the user confirms the text area shown in FIG. and the result of the OCR processing is correctly performed.

As described above, according to the present embodiment, in a case where capturing an image in close proximity to a paper document using the mobile terminal, it is possible to automatically select an image suitable for the OCR processing without significantly impairing a performance. In particular, it is possible to select an image suitable for the OCR processing without significantly impairing the performance on a mobile terminal with a little CPU or GPU resource as compared with the PC terminal.

Other Embodiments

In the above embodiment, as an example in which blurring occurs in the photographed image, the hand-trembling of the camera was described by way of example. However, a blurring may occur in the photographed image due to trembling of the subject in a case where a subject (for example, paper) is brought closer to a fixed camera.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the information processing apparatus of the invention, it is possible to automatically select a good image for the OCR processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-045918, filed Mar. 9, 2016, which is hereby incorporated by reference wherein in its entirety.

What is claimed is:

1. An information processing apparatus, comprising:
an acquisition unit configured to acquire an image obtained by photographing a part of a subject;
a specification unit configured to specify a relative position between the obtained image and the entire subject;
a determination unit configured to determine a specific area included in the obtained image based on the specified relative position;
a calculation unit configured to calculate an edge amount of the determined specific area; and
a character recognition unit configured to execute a character recognition processing on the specific area in a case where the calculated edge amount in the specific area is larger than a first threshold,
wherein the first threshold is obtained based on an edge amount of an area corresponding to the specific area of an image whose a certainty factor of a result of the character recognition process being previously executed is equal to or larger than a second threshold.

2. The information processing apparatus according to claim 1,
wherein the acquisition unit acquires a plurality of images obtained by photographing the part of the subject for a predetermined period of time,
wherein the calculation unit calculates edge amounts of the specific areas of the plurality of images respectively, and
wherein, in a case where the edge amount in the specific area of the image having the largest edge amount of the specific area calculated by the calculation unit is larger than the first threshold, the character recognition unit executes the character recognition processing on the specific area included in the image having the largest edge amount.

3. The information processing apparatus according to claim 1,
wherein, in a case where the calculated edge amount in the specific area is not larger than the first threshold, the acquisition unit acquires an image obtained by photographing a part of the subject under a changed photographing condition, and
wherein the calculation unit calculates an edge amount of the specific area included in an image obtained by photographing condition under a changed photographing condition.

4. The information processing apparatus according to claim 1, further comprising:
a management unit configured to manage an edge image in which each pixel has an edge intensity, the edge image corresponding to the image for which the character recognition processing has been executed by the character recognition unit,
wherein the first threshold obtained by using the edge image managed by the management unit.

5. The information processing apparatus according to claim 4, wherein the management unit manages the edge image corresponding to the image on which the character recognition process is executed in a case where a certainty factor of a result of the character recognition process being executed by the character recognition unit is equal to or larger than the second threshold.

6. The information processing apparatus according to claim 4,
wherein the management unit manages the edge image in association with a position in the subject, and
wherein the character recognition unit uses a threshold of a corresponding position which corresponds to a position of the specific area as the first threshold, the threshold of the corresponding position being obtained from the edge image including the corresponding position.

7. The information processing apparatus according to claim 6, wherein the position of the specific area is determined based on a feature amount of the image acquired by the acquisition unit.

8. The information processing apparatus according to claim 1, further comprising:
a display unit configured to display the image acquired by the acquisition unit, the image including a text area in which a result of the character recognition process is reflected; and
a reception unit configured to receive a selection of the text area from the image displayed by the display unit.

9. The information processing apparatus according to claim 8, further comprising:
an output unit configured to output the image acquired by the acquisition unit, position information of the text area whose selection is received by the reception unit, and a text included in the text area.

10. An information processing method comprising the steps of:
acquiring an image obtained by photographing a part of a subject;
specifying a relative position between the obtained image and the entire subject;
determining a specific area included in the obtained image based on the specified relative position;
calculating an edge amount of the determined specific area; and
executing a character recognition processing on the specific area in a case where the calculated edge amount in the specific area is larger than a first threshold,
wherein the first threshold is obtained based on an edge amount of an area corresponding to the specific area of an image whose a certainty factor of a result of the character recognition process being previously executed is equal to or larger than a second threshold.

11. A non-transitory computer readable storage medium storing a program for causing a computer to function as an information processing apparatus, where the information processing apparatus comprises:
an acquisition unit configured to acquire an image obtained by photographing a part of a subject;
a specification unit configured to specify a relative position between the obtained image and the entire subject;
a determination unit configured to determine a specific area included in the obtained image based on the specified relative position;
a calculation unit configured to calculate an edge amount of the determined specific area; and
a character recognition unit configured to execute a character recognition processing on the specific area in a case where the calculated edge amount in the specific area is larger than a first threshold,
wherein the first threshold is obtained based on an edge amount of an area corresponding to the specific area of an image whose a certainty factor of a result of the character recognition process being previously executed is equal to or larger than a second threshold.

* * * * *